May 12, 1936.     H. PALMER     2,040,707

LIQUID FUEL DISTRIBUTING APPARATUS

Original Filed Nov. 1, 1934     6 Sheets-Sheet 2

Fig. 2.

Inventor

Harry Palmer, dec'd.
By Bessie L. Palmer,
    Administratrix.

By Geo. P. Kimmel
        Attorney

May 12, 1936. H. PALMER 2,040,707
LIQUID FUEL DISTRIBUTING APPARATUS
Original Filed Nov. 1, 1934 6 Sheets-Sheet 3

Inventor

Harry Palmer, dec'd.
By Bessie L. Palmer,
Administratrix.

By Geo. P. Kimmel
Attorney

May 12, 1936. H. PALMER 2,040,707

LIQUID FUEL DISTRIBUTING APPARATUS

Original Filed Nov. 1, 1934 6 Sheets-Sheet 4

Inventor

Harry Palmer, dec'd.
By Bessie L. Palmer,
Administratrix.

By Geo. P. Kimmel
Attorney

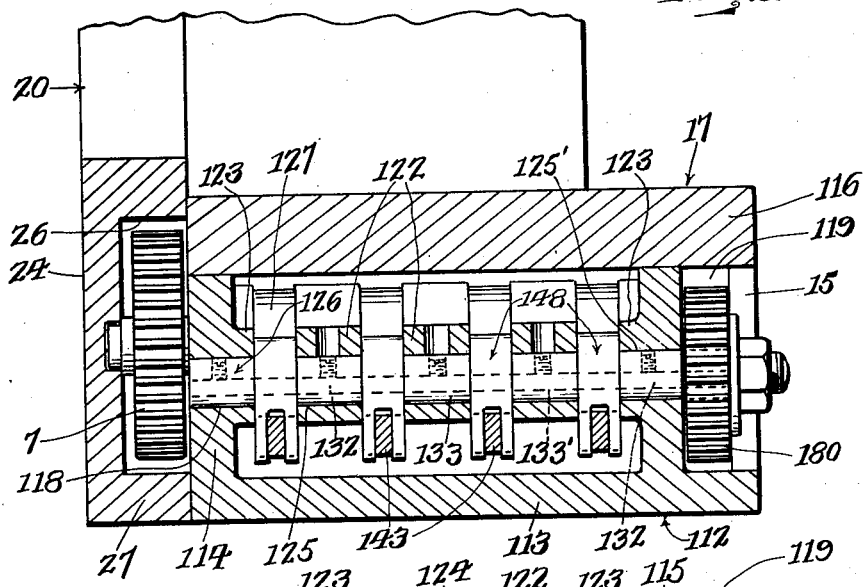
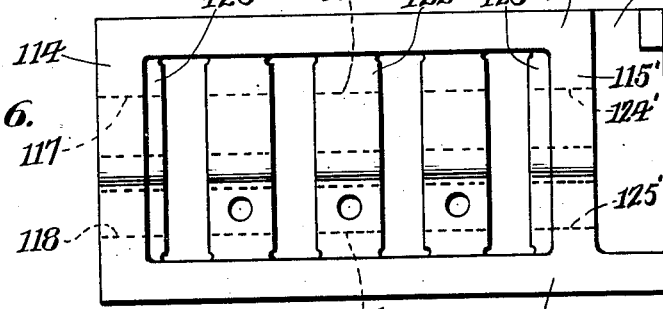
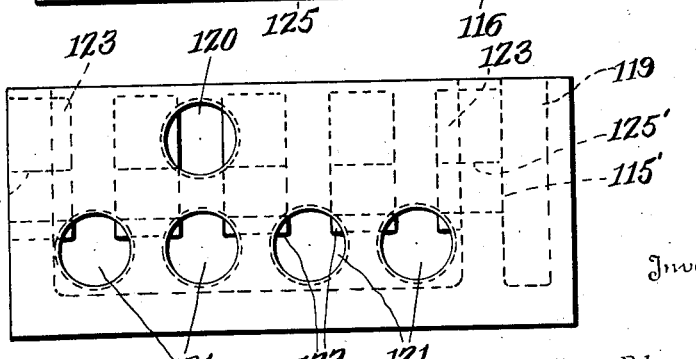

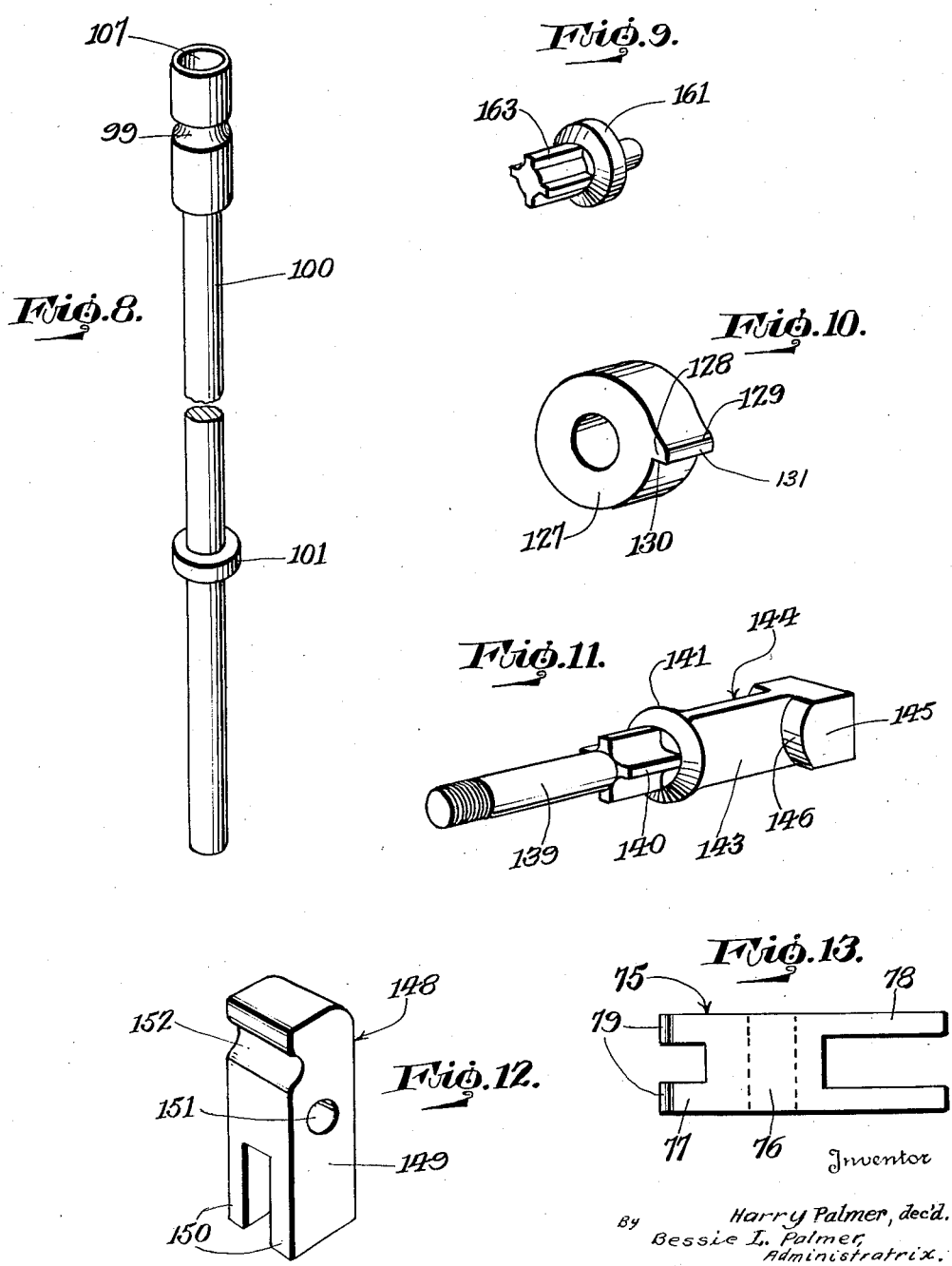

Patented May 12, 1936

2,040,707

UNITED STATES PATENT OFFICE 2,040,707

LIQUID FUEL DISTRIBUTING APPARATUS

Harry Palmer, deceased, late of Malden, Mass., by Bessie L. Palmer, administratrix, Allston, Mass., assignor to Palmer Inventions, Inc., a corporation of Massachusetts Application November 1, 1934, Serial No. 751,103
Renewed March 23, 1936

15 Claims. (Cl. 103—2)

This invention relates to a liquid fuel distributing apparatus.

The object of the invention is to provide, in a manner as hereinafter set forth an apparatus of the class referred to for distributing, from a common source of supply liquid fuel charges successively to the cylinders of a bank of internal combustion engines common to and operating a power transmitting shaft.

A further object of the invention is to provide, in a manner as hereinafter set forth, an apparatus of the class referred to for delivering liquid fuel charges successively at spaced intervals to the cylinders of a bank of internal combustion engines to provide for the successive operation of the latter for the purpose of driving a power transmitting shaft common thereto.

Further objects of the invention are to provide, in a manner as hereinafter set forth, an apparatus of the class referred to which is comparatively simple in its construction and arrangement, strong, durable, compact, thoroughly efficient in its use for the purpose intended thereby and readily assembled.

To the above ends essentially and to others which may hereinafter appear, the invention consists of such parts, and such combination of parts which fall within the scope of the invention as claimed.

In the drawings:

Figure 2 is a front elevation,

Figure 1:
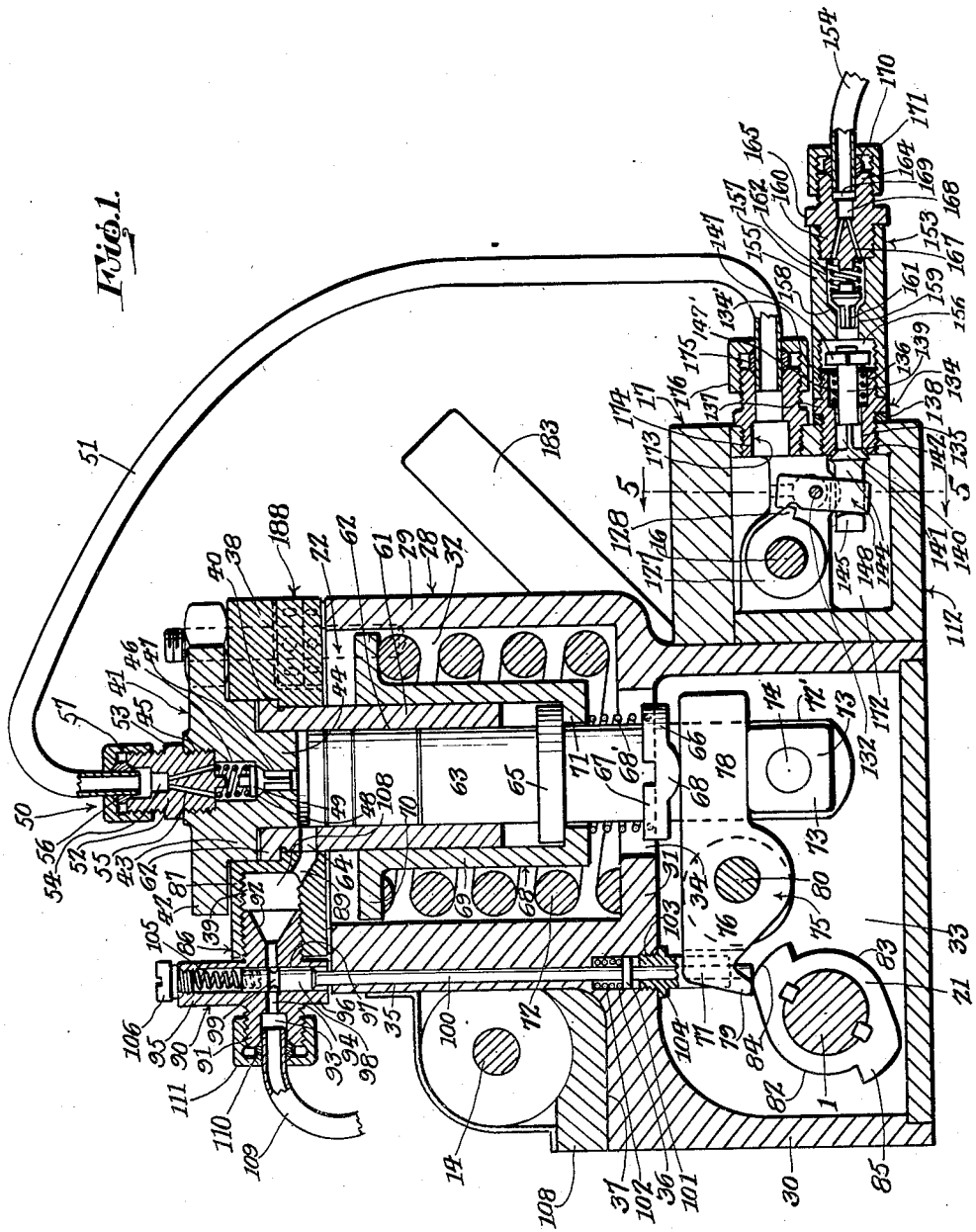
Figure 1 is a vertical sectional view of the apparatus.
Figure 3:
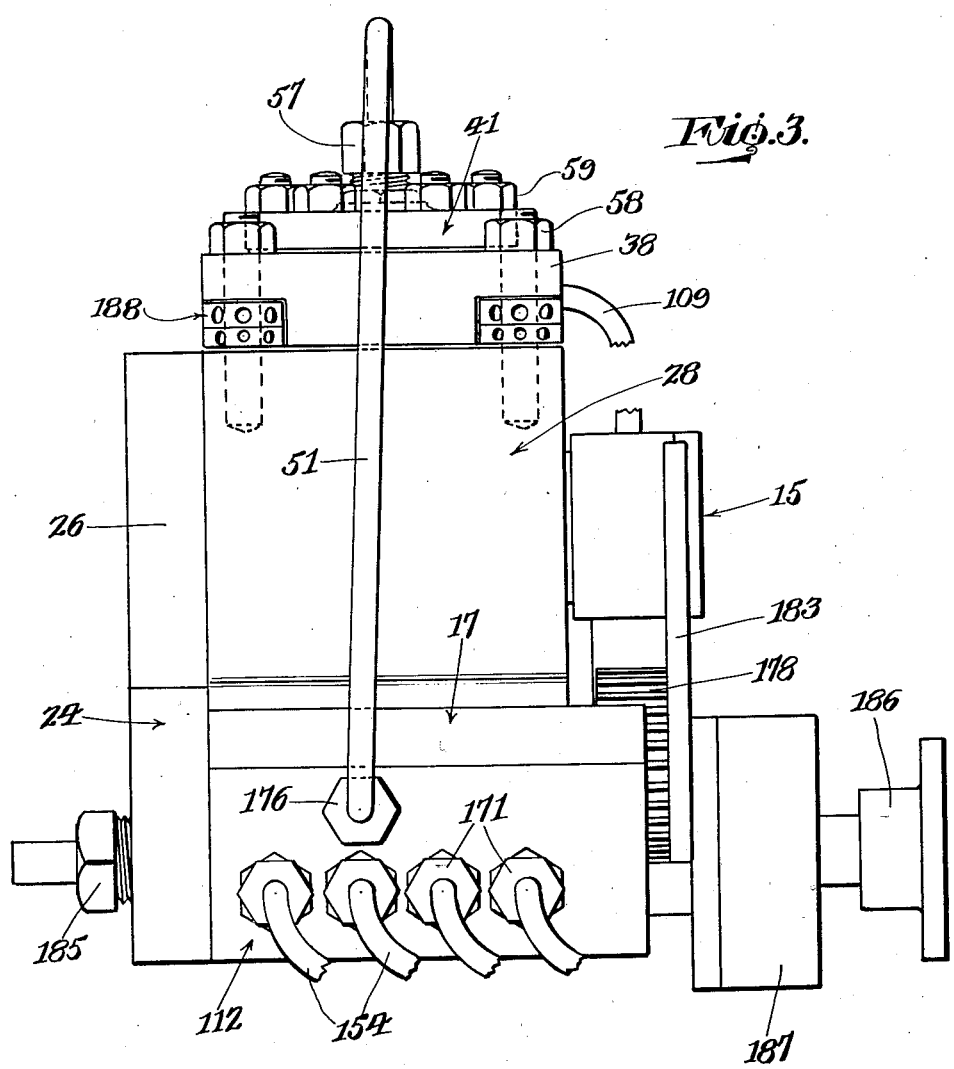
Figure 3 is an elevation looking towards the discharge side of the apparatus.
Figure 4:
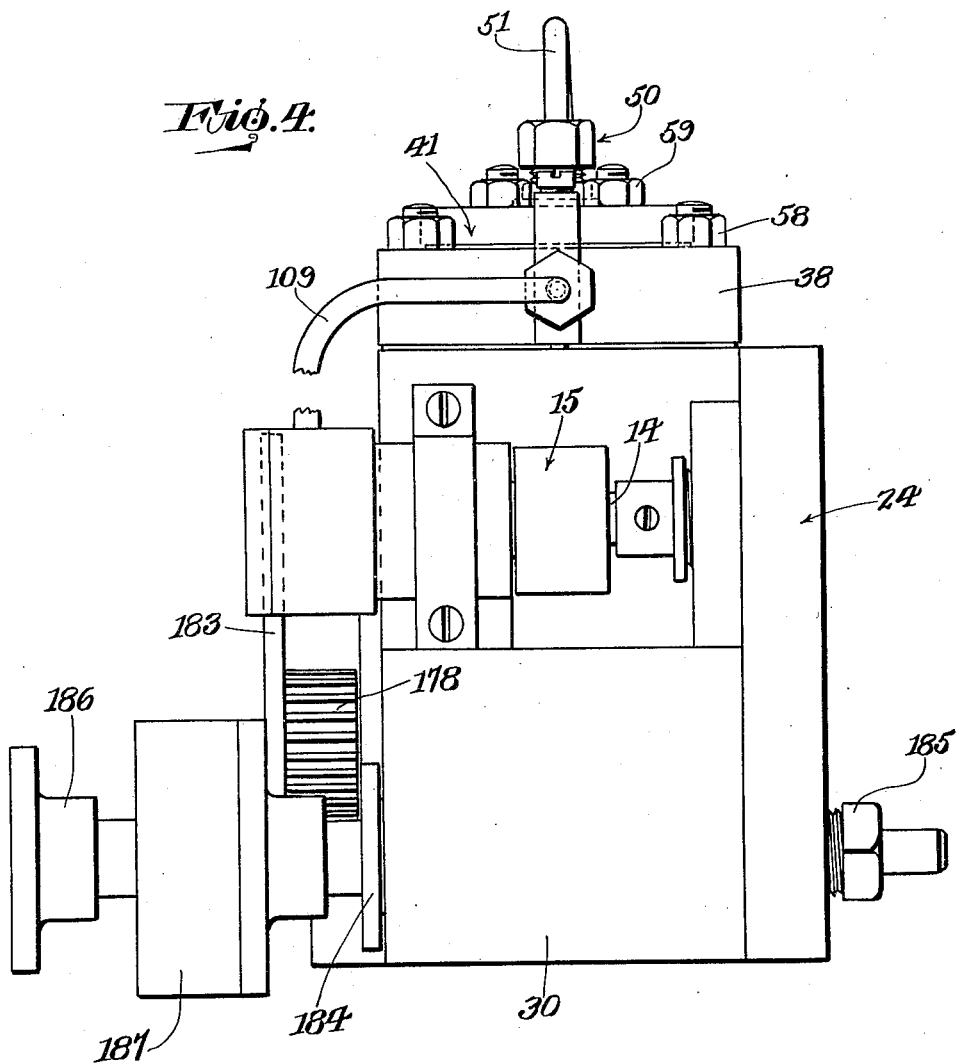

Figure 4 is a view similar to Figure 3 looking towards the intake side of the apparatus, Figure 5 is a section on line 5—5, Figure 1, Figure 6 is a top plan view of the fuel charge distributing mechanism housing with the top closure for the latter removed, Figure 7 is a front elevation of the fuel charge distributing mechanism housing with the top closure for the latter removed, Figure 8 is an elevation of the controlling valve of the fuel intake valve mechanism, Figure 9 is a perspective view of the form of the controlling valve employed for a fuel charge line, Figure 10 is a perspective view of the form of cam employed in the fuel charge distributing mechanism, Figure 11 is a perspective view of the form of valve employed in the fuel charge distributing mechanism, Figure 12 is a perspective view of the form of shifting member employed in the fuel charge distributing mechanism for the valves of the latter, and Figure 13 is a top plan view of the shifting member for the plunger.

The bank of internal combustion engines is not shown. The apparatus includes a gear train or mechanism for operating certain elements thereof. The said gear mechanism has as a part thereof, an operating shaft which is driven from a suitable driving connection, not shown between it and the bank of engines. The apparatus is shown by way of example for the adaptation thereof with a bank of four engines, but it is to be understood that it may be set up in a manner whereby it may be employed in connection with a bank of engines of a smaller or greater number of engines.

The gear train or mechanism (Figure 2) includes the operating shaft referred to indicated at 1, a pair of gears 2, 3 carried by shaft 1, a gear 4 meshing with gear 2, a pair of intermeshing gears 5, 6, the former meshing with gear 4 and the latter with gear 7, a gear 8 meshing with gear 3, a gear 9 meshing with gear 8 and a gear 10 meshing with gear 9. The gears are of the desired ratio with respect to each other for the purpose of operating those parts or elements driven therefrom at the desired speed. The gears 2, 5, 6 are of the same diameter. The shafts upon which gears 5, 6 are mounted are designated 11, 12 respectively. The gears 9, 10 are of like diameter but of smaller diameter than the gears 2, 5, 6. The gear 9 is mounted on a shaft 13. The gear 10 is mounted on the shaft 14 of a driving means for a combined pump and strainer structure 15 which will be presently referred to. The gear 2 is of less diameter than gear 7. The latter is the larger of the gears and it is connected to the operating shaft 16 of a fuel charge distributing mechanism 17 (Figures 2 and 5 to 7) to be hereinafter referred to. The gear 4 is of slightly greater diameter than gear 8 but of slightly less diameter than gear 3. The shafts upon which are mounted gears 4 and 8 are designated 19, 20 respectively. The gears 2, 3 are termed drivers, the former is employed for operating the fuel charge distributing mechanism 17, and the latter for operating the driving means for the combined pump and strainer structure 15. The shaft 1 is termed a cam shaft acting to rotate the cam 21 (Figure 1) which is employed for setting and releasing a fuel expelling structure 22 (Figure 2) to be referred to for successively forcing charges of fuel into the distributing mechanism 17. The cam 21 also functions to open an intake valve mechanism to be hereinafter referred to.

The gear train or mechanism is supported from an upstanding plate 23 including a horizontal part 24 and a vertical part 25. The plate 23 is formed throughout its edges with a pair of spaced inwardly extending endless parallel flanges 26, 27 (Figures 2, 3 and 5).

The apparatus includes a housing 28 (Figure 1) formed of a cylindrical upper part 29 and a rectangular lower part 30 offset with respect to part 29. The parts 29, 30 are separated, at their points of mergence, by a web 31 which in connection with said parts forms the housing 28 with upper and lower compartments 32, 33 respectively. The web 31 has an enlarged opening 34 for establishing communication between said compartments. The plate 23 is anchored against one side of housing 28. The part 25 thereof extends upwardly from one end of housing part 30. The part 24 of plate 23 opposes and extends laterally from the other end of housing part 30. The body of housing part 29 is formed with a vertically disposed channel 35 opening at the top edge of such body. The housing 28 is formed with a socket 36 positioned in the lower portion of housing part 29 and in the top portion of housing part 30. The socket 36 opens into compartment 33. The lower end of channel 35 communicates with socket 36 through the base of the latter. The top portion of housing part 30 is extended laterally from the lower portion of housing part 29 to provide a seat 37.

Seated upon, as well as being anchored to and extending across the top of housing 28 is an annular block 38 (Figure 1) formed with a radially disposed chamber 39. The inner edge of block 38 is shouldered, as at 40. Seated on, anchored to, and extending into the block 38 is a tubular plug element 41 formed of an outer, an intermediate and an inner part 42, 43 and 44 respectively. The part 42 is of greater diameter than part 43 and the latter is of greater diameter than part 44. the parts 43, 44 are arranged within the block 38. The element 41 has its inner edge upon three different diameters, as at 45, 46 and 47. The junction of the inner edge portions form shoulders 48, 49. The edge portion 45 is of greater diameter than edge portion 46, and the latter is of greater diameter than edge portion 47. The edge portion 46 is arranged between the edge portions 45, 47. The edge portion 46 has its inner part beveled, as at 48 to provide a valve seat for a valve 49. The edge portion 46 forms a valve chamber for valve 49. The edge portion 45 is threaded for a purpose to be referred to. The edge portion 47 forms a fuel charge outlet passage and receives the stem of valve 49. Threadedly engaging with the edge portion 45 is an intake head and coupler element 50 for the inlet end of a fuel charge conducting line 51 which leads to and communicates with the fuel charge distributing mechanism 17. The element 50 comprises a peripherally threaded body 52 of circular cross section formed with a peripheral flange 53 abutting the plug element 41. The body 52 at its outer portion is formed with an internal chamber 54 for the fuel prior to the entrance of the latter into the line 51. Extending through the body 52 is a plurality of inclined spaced parts 55 which establish communication between the valve chamber formed by edge 46 and the chamber 54. The outer end wall of the chamber for valve 49 is provided by the inner end of body 52. The line 51 extends into chamber 54 and is encompassed by a compressible packing 56 which seats on body 52 and projects into the outer end of chamber 54. The line 51 is anchored to the body 52 by the cap member 57 threadedly engaging with the body 52 and coacting with the packing 56. The holdfast means for the block 38 are indicated at 58. The holdfast means for element 41 are indicated at 59. The said means 58 and 59 are shown in Figure 4.

Arranged within the compartments 32 and 33 is the intake and expelling mechanism 22 which functions to receive the fuel from the intake valve mechanism to be referred to and to expel the fuel therefrom in successive charges into the line 51. During the intake of fuel into the mechanism 22 the latter is closed to line 50. The mechanism 22 includes a sleeve or cylinder 61 open at each end, and at its outer end is peripherally flanged as at 62. The cylinder 61 extends through the block 38 and depends into the compartment 32. The flange 62 seats upon shoulder 40. The part 44 of the element 41 extends into and snugly fits the inner face of the outer portion of cylinder 61. The portion 43 of element 41 bears against the flange 62 when element 41 is anchored in position for clamping the cylinder to block 38. The inner end of cylinder 61 is spaced from the web 31. The cylinder 61 in connection with the element 41 provides a plunger chamber 62 for a reciprocatory plunger 63 functioning to draw a fuel charge into and to expel it from chamber 62. The cylinder 61 is formed with a slot 64, the outer wall of which is in very close proximity to the inner terminus of element 41. The slot 64 forms an intake for chamber 62. The inner edge portion 48 of element 41 provides an outlet for chamber 62 and such outlet is controlled by valve 49.

The plunger 63 is of a length to extend from the open or inner end of cylinder 61 into the compartment 32, and adjacent such inner end the plunger 63 is formed with a peripheral annular flange 65. Between the flange 65 and the inner end of plunger 63, the latter has mounted thereon an annular member 66 forming in connection with the plunger an upwardly opening socket or pocket 67. The lower face of member 66 is formed with a pair of diametrically disposed depending rounded lugs 68, only one shown. Surrounding the plunger 63 and extending into pocket 67 provided by plunger 63 and member 66 is a coiled spring 68'. Arranged within compartment 32 surrounding the cylinder 61 and the plunger 63 and extending inwardly of the cylinder is a combined controlling spring compressing and plunger shifting element 68 formed of a sleeve-like body 69 provided at its outer end with an outwardly directed annular flange 70. The inner end of body 69 is provided with an inwardly extending annular flange 71 which coacts with the flange 65 to provide the fuel expelling stroke for the plunger. The flange 71 bears against the outer end of spring 68'. The controlling spring for the mechanism 68 is designated 72, surrounds the body 69 and is interposed between the flange 70 and web 31.

That part of plunger 63 below the lugs 68 is flattened, as at 72' and carries a pair of polygonal shaped abutment members 73 on each side thereof, only one being shown. Supporting means for the members 73 is indicated at 74 and is secured to part 72' of plunger 63. The members 73 form elements of a cam operated shifting device for imparting intermittently a suction stroke to plunger 63 against the action of the spring 72.

The cam operated shifting device also includes a plunger shifting member 75 formed of an intermediate part 76 and a pair of oppositely extending end parts 77, 78. The former is of less length than the latter, bifurcated and is provided with a pair of depending, spaced outwardly inclined noses 79. The part 78 is bifurcated, straddles the part 72' of plunger 63, seats on opposed parallel faces of the members 73 and bears against the lugs 68. The intermediate part 76 of the shifter member 75 is eccentrically mounted on an eccentric shaft 80 which is journaled in and extended from one side of housing 22. The shaft 80 on its projected end carries a gear wheel 81 (Figure 2).

The cam 21 is rotatable and employed for intermittently operating the cam operated shifting device. The cam 21 functions during each revolution thereof to coact with the noses 79 for the purpose of lowering the part 78 twice at spaced intervals. The cam 21 is formed with a pair of oppositely disposed working surfaces 82, 83 of like length which gradually rise and terminate into a pair of oppositely disposed lobes 84, 85 respectively. The noses 79 travel against the working surfaces and these latter coact with the noses 79 for the purpose of intermittently elevating part 77 and lowering part 78 until the nose passes off the lobes. When part 78 lowers it will coact with the members 73 and impart a suction stroke to plunger 63 against the action of the controlling spring 72. The direction of movement of the plunger 63 on the imparting of the suction stroke thereto is towards compartment 33. As the plunger 63 moves in such direction the flanges 68 and 71 will coact to move the element 68 towards the web 31 and store up tension in or compress spring 72. When noses 79 passes off a lobe the spring 72 will be free to act on flange 70 to shift the element 68, and the flanges 65 and 71 will coact due to the expanding action of spring 72 to impart an expelling stroke to the plunger 63.

The inlet valve mechanism which is associated with the plunger chamber 62 is generally indicated at 86 and it is positioned within and extended outwardly from the chamber 39 of block 38. The chamber 39 is closed at its inner end and open at its outer end. The block 38 is formed with an inclined outlet port 89 which registers with the slot 64 formed in the cylinder 61. The port 89 extends through the shoulder 40. Extending into and threadedly engaging with threaded wall 87 of the chamber 39 is a housing 90 including a plug shaped body 91 having a flaring outlet 92 at its inner end, an annular inlet 93 at its outer end, an axially arranged channel 94 connecting said inlet and outlet, a pair of oppositely extending spaced endwise aligning tubular parts 95, 96 disposed at right angles to channel 94 and a diametrically disposed valve chamber 97, intersecting channel 94 and having its wall forming flush continuations of the inner faces of the parts 95, 96.

Mounted in the chamber 97 is a cam actuated spring controlled reciprocatory vertically disposed valve 98, of a circular cross section and formed intermediate its ends with an annular groove 99 for establishing communication between the outer and inner portions of the channel 94. The lower end of valve 98 merges into an elongated valve stem 100 which extends down through channel 35 and depends below socket 36 to permanently seat on cam 21. The stem 100 is formed with an annular flange 101 positioned in socket 36. Interposed between the flange 101 and the base of socket 36, as well as surrounding stem 100 is a coiled spring 102. Threadedly engaging with the wall of socket 36, as well as depending from the latter is a peripherally threaded guide 103 for the lower portion of stem 100. The guide 103 is peripherally shouldered, as at 104 for the purpose of abutting the lower face of the top of part 30 of housing 28. The cam 21 is of a length whereby its surfaces 82, 83 and lobes 84, 85 will provide for the seating thereon of stem 100 and the noses 79. Arranged within the tubular part 95 is a coiled controlling spring 105 for valve 98. Threadedly engaging with the interior of the tubular part 95 for closing the upper end of the latter is an abutment plug 106. The valve 98 is formed with a socket 107 in its upper end. The spring 105 abuts the inner end of plug 106 and extends into and abuts the base of socket 107. The flaring outlet 92 coacts with the chamber 39 to form a fuel receiving space 108 from which extends the port 89.

The combined pump and filtering structure 15, which may be of any suitable construction is mounted on a base plate 108 and is positioned upon the seat 39. The structure 15 constitutes a fuel filtering and supply pump element which sucks the fuel out from a reservoir or tank, not shown and feeds it, after it has been filtered, through the supply line 109 to the intake valve mechanism. The line 109 opens and extends into the intake 93 (Figure 1). Encompassing line 109 and extending into intake 93 is a compressible packing 110. Threadedly engaging with the valve housing 91, bearing against the packing 110 and encircling line 109 is a securing cap 111 for the latter.

With reference to Figures 1, 5, 6, 7 and 10 to 12. The fuel charge distributing mechanism 17 includes an open top housing 112 formed of a bottom 113, an end wall 114, an inner side wall 115, an outer side wall 116 and an outer end wall 115'. The top of the housing 112 is closed by a removable plate 116'. The end wall 114 is formed with a pair of spaced openings 117, 118, the former being arranged rearwardly of and above the latter. The end wall 115' is arranged inwardly with respect to the outer ends of the walls 115, 116. The inner side wall 115 in proximity to and outwardly with respect to wall 115' is formed with a vertically disposed slot 119. The outer side wall 116 is formed with an opening 120 in proxmity to its top and between its vertical meridian and the wall 114. The outer side wall 116 is also formed in close proximity to the bottom 113 with a row of equi-distant spaced side-wise aligning openings 121. The walls of openings 120, 121 are threaded. Integral with the inner faces of the walls 115, 116 and above the openings 121 is a series of equi-distant spaced transversely extending webs 122. Integral with the inner faces of the walls 114, 115 and 116 and with the inner faces of the walls 114, 115' and 116 are webs 123 of less width than either of the webs 122. One of the webs 123 is spaced from the inner web of said series of webs 122, and the other web 123 is spaced from the outer web of the series of webs 122. The webs 122, 123 are formed with endwise aligning openings 125 which endwise align with the opening 118. The wall 115' is formed with a pair of spaced openings 124', 125' which align with the openings 124, 125 respectively. Journaled in the aligning openings 117, 124, 124' is the operating shaft 16 for the said mechanism 17. The shaft 16 operates in a counter-clockwise direction, extends beyond wall 114 and is journaled (Figure 5) in the part 24 of plate 20. As hereinbefore set forth the shaft 16 is connected to gear 7 thereby on the operation of the latter, the shaft 16 will be driven. Journaled in the aligning openings 118, 125, 125' is a composite shaft 126 connected to an adjusting device therefor. The said device is to be later referred to. The shaft 126 projects beyond the wall 115'. The shaft 16 terminates within the opening 124' in wall 115'.

Fixed to the shaft 16 between the webs 122 and between each end web 122 and a web 123 is a set of actuating cams 127 corresponding in number to the number of and arranged above the openings 121. The cams 127 are of like construction, and each includes a radically disposed lobe 128 having an inclined side face 129 and a straight face 130 disposed in a plane parallel to the diametric center of the cam The lobe 128 is of tapered form having a working terminus 131.

The shaft 126 constitutes a combined carrier and control for the shifter members, to be referred to, for the fuel charge outlet valve mechanism. The shaft 126 is formed of an adjustable elongated bar 132 of a length to project from the wall 115'. Fixed at spaced intervals lengthwise of bar 132 are short cylindrical members 133, each formed with a bore 133' eccentrically disposed with respect to the axis thereof. The members 133 are journaled in the openings 118, 125, 125' and have their ends flush with the ends of the latter.

The fuel charge outlet valves for the mechanism 17 are designated 134 and correspond in number to the number of the openings 121. The valves 134 are of like construction, and but one will be described. Each outlet valve 134 comprises a tubular plug 134' having two parts of different inner diameters as indicated at 135, 136. The lug 134' is peripherally threaded and formed with a peripheral shoulder 137 intermediate the ends of its peripheral threads. The plug 133 threadedly engages with the wall of an opening 121 and has its inner end flush with the inner face of side wall 116 of housing 112. When plug 134' is secured to the latter, a locking nut 138 is interposed between shoulder 137 and wall 116. The part 135 is of smaller inner diameter than the 136 and forms a passage for an extension 139, and a bearing for a stem 140 secured to the inner end of the extension 139. The stem 140 projects outwardly from a beveled valve member 141. The stem 140 is substantially of cruciform cross section. The extension 139 is of circular cross section and projects beyond the outer end of plug 134'. The part 135 of the plug 133 is the rear part of the latter, and has its rear edge beveled, as at 142 to provide a seat for the valve member 141 which is arranged inwardly of the rear end of plug 134'. The stem 140 projects from the forward side face of valve member 141 and has its lengthwise edges spaced inwardly from the edge of the latter. The rear side face of valve member 141 has formed integral therewith, diametrically thereof, the shank 143 of a T-shaped pull member 144 which projects rearwardly into the housing 112. The head of member 144 is designated 145 and has its forward edge portions rounded as at 146. The outer end of the extension 139 carries a stop 147 for coaction with the outer end of plug 133 for arresting the inward shift of the valve member 141 when the pull member 144 is moved rearwardly by a means to be presently referred to and also to compress a controlling spring 147' which surrounds the extension 139. The spring 147' acts to maintain the valve member 141 normally closed and it is interposed between the stop 147 and the shoulder provided by the juncture of the two inner diameters of the plug 134'.

There is associated with each pull member 144 a shifting member 148. Each member 148 is mounted upon the bar 129 between the ends of a pair of opposed members 133. The shifter members 148 are operated from the cams 127 on the shaft 16. The cams 127 are so disposed on shaft 16 as to provide for the successive operation of the members 148 resulting in the successive operations of the engines. The latter may be operated simultaneously by positioning the lobes of the cams 127 in sidewise alignment. Each member 148 (Figure 12) comprises a block 149 having its lower portion bifurcated to provide a pair of arms 150 which straddle the shank 143 of a pull member 144. The block 149 between its transverse median and its upper end is formed with an opening 151 for the purpose of mounting it upon that portion of the length of bar 129 between a pair of webs. The normal tendency of each shifting member 148 is to position the lower portion thereof to extend rearwardly with respect to shaft 126. The rear side of block 149 is formed, near its top with a transverse groove 152 for receiving the outer end of the lobe 128 of a cam 127 whereby on the operation of shaft 16 the lobe 128 will ride upwardly against the rear of a member 148 and enter groove 152. The wall of the groove 152 coacts with the outer end of the lobe of the cam to provide for the lower portion of the block 149 swinging rearwardly against the edge portions 146 of head 145 causing the member 144 to move rearwardly exerting a pull on valve member 141 to move it to open position to enable a fuel charge to pass into the plug 134'. The shifting of the lower portion of member 148 is had against the action of the spring 147' and when the lobe clears the groove 152 the spring 147' will cause the seating of valve 141 to close plug 134'.

Coupled to and extended outwardly from the outlet valves 134 are spring controlled intake valve mechanisms 153, which are attached to the intake ends of the fuel charge feed lines 154 leading to the cylinders of the engines of the bank. Each mechanism 153 includes a hollow casting 155 formed therein with a socket 156 at its inner end, a valve chamber 157, a valve seat 158 at the rear end of chamber 157, a passage 159 connecting socket 156 to chamber 157 and a socket 160 into which chamber 157 opens. Arranged within chamber 157 is a valve member 161 and a controlling spring 162 for the latter. The valve member 161 has a stem 163 arranged in passage 159. The spring 162 normally tends to maintain valve member 161 against its seat 158. The walls of the sockets 156 and 160 are threaded. The plug 134' extends into socket 156 and threadedly engages with the wall of the latter. When casting 155 is connected to plug 134', the shoulder 137 on the latter abuts the inner end of the casting. Extending into socket 160 and threadedly engaging with the walls of the latter is a peripherally threaded plug 164, formed intermediate the ends of the threads thereon with a peripheral shoulder 165, which when plug 164 is connected to casting 155 abuts the outer end of the latter. The inner end of plug 164 provides the outer end of valve chamber 157. The spring 162 is arranged between the inner end of plug 164 and the valve member 161. The plug 164 is provided with a plurality of outlet ports 167, an axial channel 168 and a socket 169. The ports 167 are inclined towards each other, extend from the inner end of the plug and open into the inner end of channel 168. The outer end of the latter opens into socket 169. Extending into the latter is a fuel charge feed line 154. Encompassing the latter and projecting into the outer end of the socket 169 is a compressible packing 170 and threadedly engaging with the plug 164 is a securing cap 171 for line 156.

The fuel charge conducting line 51 is coupled to and communicates with the fuel receiving chamber 172 provided by the housing 112, and for such purpose a coupling device 173 is employed, which consists of a peripherally shouldered sleeve 174 which extends into and threadedly engages with the wall of opening 120. The sleeve 174 is formed of two different inner diameters. The part of smallest inner diameter is at the outer portion of the sleeve and extending into such part is the line 51. Encompassing the latter and extending into the outer end of sleeve 174 is a compressible packing 175. Mounted on the line 51 bearing against the packing 175 and threadedly engaging with the sleeve 174 is a securing cap 176 for line 51.

The shifting member 75 is capable of being adjusted for varying the length of the suction stroke of plunger 63. The shifting members 148 are capable of being adjusted for varying the extent of the opening movement for the valve 141. The adjustment of members 75, 148 is had simultaneously and for such purpose an adjusting device 177 common to said members 75, 148 is employed. The device includes a train of intermeshing gears consisting of the gears 178, 179, 180 and the gear 81. The gear 178 is of greater diameter than the gears 179, 180 and 81. The gears 179, 180 and 81 are of like diameter. The gear 81 meshes with gear 178, the latter with the gear 179. The gear 180 meshes with gear 179 and is fixed to the bar 132 of the shaft 126 and extends through slot 119. The gears 178, 179 are carried by shafts 181, 182 respectively. The gear 81 is eccentrically mounted on shaft 80.

When gear 81 is shifted from gear 178 and depending on the direction of the shift of gear 81, the shaft 80 is elevated or lowered carrying element 75 therewith, thereby varying the period of contact of nose 79 with cam 21. By this arrangement the stroke of plunger 63 may be adjusted. When gear 179 is shifted from gear 178 and depending upon the direction of shift of gear 179, the latter will shift gear 180 which is connected with shaft 126. The gear 180 when shifted will carry shaft 126 therewith and provide for the latter varying the position of the lobes 128 relatively to the shifting members 148. The varying of the position of the lobes 128 relative to members 148 enables an adjustment to vary the extent of the opening movement of valves 141. Attached to the shaft 181 is a shifting lever 183 therefor. The shafts 181, 182 are journaled in housing 22.

The shaft 1 is extended from housing part 30 and plate 24 and has mounted thereon spaced packing glands 184, 185 respectively engaging with a wall of housing part 30 and with the plate 24. One end of the shaft 1 carries a drive pulley 186 therefor which is operated from a driving connection, not shown, leading from the bank of engines. Connected to shaft 1 adjacent housing part 30 is governor 187 preferably of the form shown in copending application Serial No. 731,207 filed June 18, 1934. The purpose of the governor 187 is to prevent the operation of the actuation of member 75 from cam 21 when the engines reverse thereby preventing the impairment of the cam 21 and member 75. The foregoing statement also applies to the stem 100 of the valve 98 which forms an element of the intake valve mechanism for the cylinder 61.

The shifting device 177 controls the intake and output of the liquid fuel simultaneously. The cam 21 provides for the operation of member 75 and valve stem 100 in a manner whereby the valve 98, will close before the plunger 63 starts its expelling stroke.

There is associated with the block 38, means indicated as at 188 for vertically adjusting bodily the block 38, element 41, cylinder 61, and mechanism 90.

What is claimed is:

1. In an apparatus for distributing liquid fuel charges to the cylinders of a bank of internal combustion engines, a liquid fuel intake and expelling mechanism including a combined fuel suction and expelling element and means for imparting an expelling stroke to said element, a valve controlled fuel supply mechanism communicating with the other of said mechanisms in proximity to its outer end and including a normally closed valve, a liquid fuel outlet structure opening into said intake and expelling mechanism at its outer end, a distributor mechanism for liquid fuel charges including a plurality of outlet valve mechanisms, internally arranged shifting members for opening the outlet valve mechanism and rotatable cams opposing one side of and for successively operating said members to open the outlet valve mechanisms, a normally closed means for conducting liquid fuel charges from said outlet structure to said distributing mechanism, a shiftable device for imparting a suction stroke to said element, a rotatable cam common to said device and said valve for intermittently operating said device and intermittently opening said valve, and valve controlled means communicating with said outlet valve mechanisms for feeding fuel charges to the cylinders of the engines.

2. An apparatus for distributing liquid fuel charges of the construction set forth in claim 1 including means common to and for simultaneously adjusting the rotatable cam common to said device and valve and the rotatable cams common to shiftable members for varying the length of the suction stroke of the expelling element and the extent of the opening of the outlet valve mechanisms.

3. An apparatus for distributing liquid fuel charges of the construction set forth in claim 1 including an operating means for the rotatable cam, operating means for said liquid fuel supply mechanism driven from the operating means for the rotatable cam, and operating means for the distributor mechanism driven from the operating means for the rotatable cam.

4. In an apparatus for distributing liquid fuel charges to the cylinders of a bank of internal combustion engines, a liquid fuel intake and expelling mechanism, a normally closed fuel supply controlling mechanism opening into the other of said mechanisms and including a valve controlled normally closed fuel outlet structure, a fuel charge distributor mechanism communicating with said structure, means common to said intake and expelling mechanism and to said supply controlling mechanism for imparting a fuel suction action to said fuel intake and expelling mechanism and for opening said fuel supply controlling mechanism to a source of fuel supply, said intake and expelling mechanism having a part thereof for imparting a fuel expelling action thereto, said fuel supply controlling mechanism having a part thereof normally acting to close it and actuated from said means to intermittently open it, said distributor mechanism including normally closed valve outlet devices and means for operating them, and valve controlled liquid fuel charges feed lines leading from said outlet devices.

5. In an apparatus for the purpose set forth, a fuel charge distributor mechanism including normally closed fuel charge outlet valve devices, shiftable elements for successively opening said devices and spaced rotatable parts acting on said elements to provide for these latter to successively open said devices, said elements, devices and parts being arranged interiorly of said mechanism, a fuel intake and expelling mechanism for communication with the distributor mechanism and including coacting elements for imparting a fuel expelling stroke thereto, means for imparting a fuel suction stroke to the intake and expelling mechanism, and an adjusting device common to said means and parts for varying simultaneously the extent of the suction stroke and the opening of said outlet valve devices.

6. In an apparatus for the purpose set forth, a fuel charge distributor mechanism including fuel charge outlet valve devices, a fuel intake and expelling mechanism for communication with the distributor mechanism and including coacting elements for imparting a fuel expelling stroke thereto, means for imparting a fuel suction stroke to the intake and expelling mechanism, an adjusting device common to said means and distributor structure for varying simultaneously the extent of the suction stroke and the opening of said outlet valve devices, driving means for said means for imparting the fuel suction stroke, and operating means for said distributor structure operated from said driving means.

7. In an apparatus for the purpose set forth, a distributor mechanism for liquid fuel charges, a liquid fuel intake and expelling mechanism for forcing fuel charges into said distributor mechanism, a valve controlled liquid fuel supply mechanism opening into liquid fuel intake and expelling mechanism and including a normally closed spring controlled valve formed with a stem, said liquid fuel intake and expelling mechanism including coacting elements for intermittently imparting a fuel expelling stroke therefor, said distributor mechanism having actuable means arranged therein to provide for the successive distribution of fuel charges therefrom, and means common to said liquid fuel supply mechanism and to said fuel intake and expelling mechanism for imparting a suction stroke to the latter and for intermittently acting upon said stem to intermittently open said valve.

8. In an apparatus for the purpose set forth, a distributor mechanism for liquid fuel charges, a liquid fuel intake and expelling mechanism for forcing fuel charges into said distributor mechanism, a valve controlled liquid fuel supply mechanism opening into liquid fuel intake and expelling mechanism and including a normally closed spring controlled valve formed with a stem, said liquid fuel intake and expelling mechanism including coacting elements, for intermittently imparting a fuel expelling stroke therefor, means common to said liquid fuel supply mechanism and to said fuel intake and expelling mechanism for imparting a suction stroke to the latter and for intermittently acting upon said stem to intermittently open said valve, said distributor mechanism including normally closed liquid fuel charges outlet devices, and an adjusting device common to said distributor mechanism and to said means for simultaneously adjusting the latter and said outlet devices for varying the extent of the suction stroke of the fuel intake and expelling mechanism and the extent of the opening of said outlet devices.

9. In an apparatus for the purpose set forth, a housing, means coupled to and opening into said housing for successively feeding liquid fuel charges to the latter, a plurality of liquid fuel outlet mechanisms connected to and opening into said housing, a rotatable shaft journaled in and extending across the housing, each of said mechanisms including a slidable closure valve, a plurality of eccentrically mounted shifting members for and slidably engaging with said valves for moving them to open position, and a plurality of cams fixed to and bodily carried by said shaft, said cams being arranged for successively actuating said members to move the valves to open position, said members being eccentrically disposed relative to said cams.

10. In an apparatus of the construction as set forth in claim 9 the providing of said valves with pull members having abutment means, and the providing of said members with means to engage said abutment means to shift the pull members for moving the vlaves to open position.

11. In an apparatus of the construction as set forth in claim 9 the providing of said valves with T-shaped pull members, and the providing of said members with bifurcated lower portions to straddle the extensions for engaging the heads of the latter for shifting the extension to move the valves to opening position.

12. In an apparatus for the purpose set forth, a housing, means coupled to and opening into said housing for successively feeding liquid fuel charges to the latter, a plurality of liquid fuel outlet mechanisms connected to and opening into said housing, a rotatable shaft journaled in and extending across the housing, each of said mechanisms including a slidable closure valve, a plurality of eccentrically mounted shifting members for and slidably engaging with said valves for moving them to open position, and a plurality of cams fixed to and bodily carried by said shaft for actuating said members to move the valves to open position, said members being eccentrically disposed relative to said cams.

13. In an apparatus for the purpose set forth, a housing, means coupled to and opening into said housing for successively feeding liquid fuel charges to the latter, a plurality of liquid fuel outlet mechanisms connected to and opening into said housing, a rotatable shaft journaled in and extending across the housing, each of said mechanisms including a slidable closure valve, a plurality of eccentrically mounted shifting members for and slidably engaging with said valves for moving them to open position, and a plurality of cams fixed to and bodily carried by said shaft for actuating said members to move the valves to open position, fuel charge feed lines, and valve controlled means for connecting said lines to said outlet valve mechanisms, said members being eccentrically disposed relative to said cams.

14. In an apparatus for the purpose set forth, a housing, means coupled to and opening into said housing for successively feeding liquid fuel charges to the latter, a plurality of liquid fuel outlet mechanisms connected to and opening into said housing, a rotatable shaft journaled in and extending across the housing, each of said mechanisms including a slidable closure valve, a plurality of eccentrically mounted shifting members for and slidably engaging with said valves for moving them to open position, a plurality of cams fixed to and bodily carried by said shaft for actuating said members to move the valves to open position, fuel charge feed lines, and valve controlled means for connecting said lines to said outlet valve mechanisms, and means for simultaneously adjusting said members relative to the cams for varying the opening movement of the valves, said members being eccentrically disposed relative to said cams.

15. In an apparatus for the purpose set forth, a housing, means coupled to and opening into said housing for successively feeding liquid fuel charges to the latter, a plurality of liquid fuel outlet mechanisms connected to and opening into said housing, a rotatable shaft journaled in and extending across the housing, each of said mechanisms including a slidable closure valve, a plurality of eccentrically mounted shifting members for and slidably engaging with said valves for moving them to open position, a plurality of cams fixed to and bodily carried by said shaft for actuating said members to move the valves to open position, a valve controlled liquid fuel supply mechanism opening into said means for successively feeding liquid fuel charges to said housing, means for intermittently opening the valve of said supply mechanism, operating means for the said means for intermittently opening the valve of said supply mechanism, and means driven from said operating means for driving said shaft, said members being eccentrically disposed relative to said cams.

BESSIE L. PALMER,
*Administratrix of the Estate of Harry Palmer, Deceased.*